W. L. FRANKS.
ADJUSTABLE MIRROR AND LIGHT.
APPLICATION FILED JAN. 22, 1912.
1,071,725.
Patented Sept. 2, 1913.
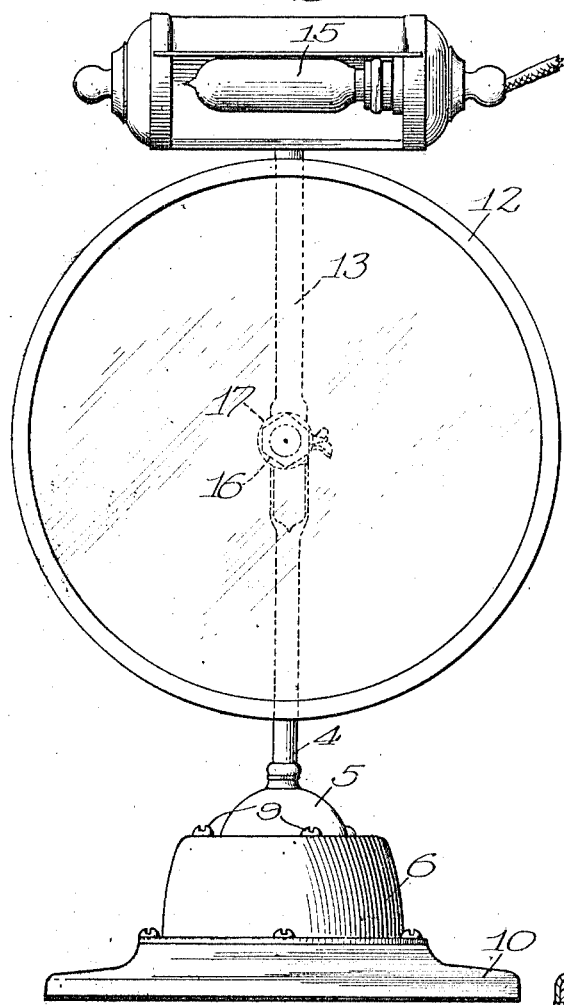
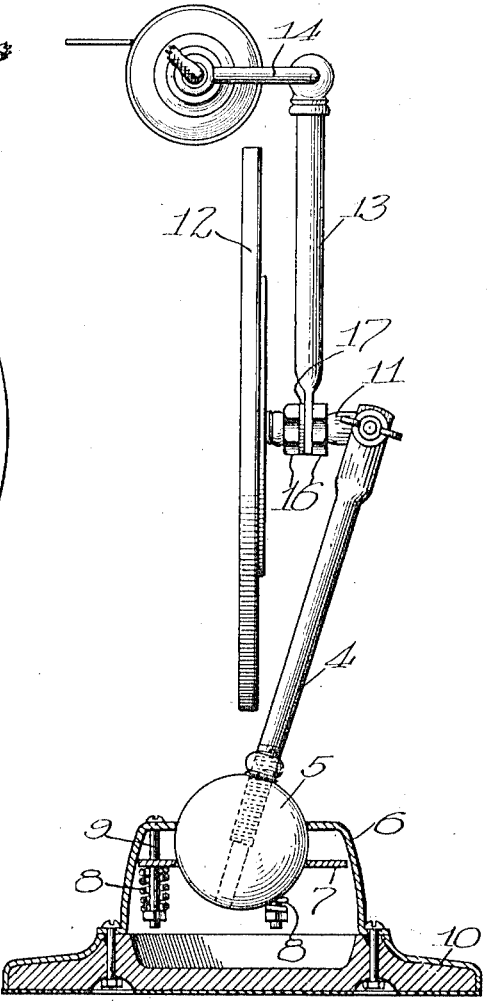
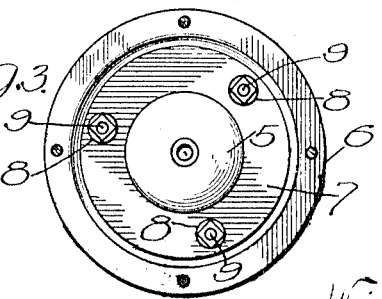
Witnesses:
H. W. Domarus Jr.
Geo. F. Schmidt
Inventor
William L. Franks
By Bulkley & Durand

UNITED STATES PATENT OFFICE.

WILLIAM L. FRANKS, OF ROCK ISLAND, ILLINOIS, ASSIGNOR OF ONE-THIRD TO EDWARD PETERS, OF ROCK ISLAND, ILLINOIS.

ADJUSTABLE MIRROR AND LIGHT.

1,071,725.     Specification of Letters Patent.     Patented Sept. 2, 1913.

Application filed January 22, 1912. Serial No. 672,652.

*To all whom it may concern:*

Be it known that I, WILLIAM L. FRANKS, a citizen of the United States of America, and resident of Rock Island, Rock Island county, Illinois, have invented a certain new and useful Improvement in Adjustable Mirrors and Lights, of which the following is a specification.

My invention relates to an adjustable mirror and light, and relates more specifically to a mirror which is supported so as to be capable of universal adjustment in combination with a light which can be subjected to any position around the periphery of the mirror.

My invention is useful for many purposes, but is particularly adapted for use as a shaving mirror. When so used, the mirror is first adjusted to the most convenient inclination, and then the light can be adjusted to any position around the periphery so as to be in position to throw the light on the various parts of the face.

By my improved construction I have provided a very useful and convenient mirror and light the purposes and construction of which will be more clearly and readily apparent by having reference to the accompanying drawings, in which—

Figure 1 is a front elevation of a structure embodying my invention. Fig. 2 is a side view with the base shown in section. Fig. 3 is a partial plan view.

As illustrated, my device comprises a supporting rod 4 to the lower end of which is secured the ball 5. This ball is held within the support or housing 6. The upper surface of this support is provided with a circular opening which is slightly smaller than the largest diameter of the ball 5. A bearing plate 7 is provided, which bearing plate is likewise provided with a circular opening within which the ball 5 is seated. This bearing plate is spring pressed upward by means of the springs 8 mounted on the bolts 9. In this manner the supporting rod can be held in any desired angular position as the edge of the bearing plate 7 and the rim of the opening in the housing or support 6 clamp the ball 5 with sufficient tension so as to permit it to be moved readily to any position, but to securely hold the same in any desired position without danger of slipping. I provide a base 10 upon which the housing 6 is mounted.

Pivotally mounted upon the upper end of the rod 4 there is a bracket 11 which carries the mirror 12. By this pivotal mounting the bracket 11 can be adjusted with respect to the rod 4. Mounted upon this bracket 11 is an arm 13 which carries the lamp bracket 14 and lamp 15. The lower end of the arm 13 is provided with a flattened end portion having an opening through which passes the bracket 11. This arm is held in position by a pair of clamping nuts 16 and washer 17. These nuts are preferably tightened sufficiently to hold the arm 13 and lamp 15 in any desired position without slipping, and yet permit the lamp to be swung readily from one side of the mirror to the other. I likewise provide a shield which can be rotated so as to shield the light to a greater or less extent.

While I have shown one specific embodiment of my invention, it is, of course, to be understood that I do not wish to limit myself to the exact construction shown and described.

What I claim as my invention is:

1. A combined light and mirror, comprising a mirror, a support for said mirror whereby said mirror can be adjusted to any angular position, and a light mounted adjacent to said mirror and movable therewith and angularly adjustable about the same without movement of said mirror.

2. A combined light and mirror, comprising a standard which is universally adjustable, a mirror carried by said standard, and a light carried by said standard and movable with said mirror and mounted for angular adjustment about said mirror without movement of said mirror.

3. A combined light and mirror, comprising a standard which is universally adjustable, a bracket pivotally connected to the upper end of said standard, a mirror carried by said bracket, an arm rotatably mounted on said bracket, and a light carried by said arm and adjacent to the periphery of said mirror.

4. A combined light and mirror, comprising an angularly adjustable standard, a bracket pivotally connected to the upper end of said standard, a mirror carried by said bracket, and a light mounted adjacent to the periphery of said mirror and angularly adjustable about the same, said light being movable with said mirror.

Signed by me at Rock Island, Illinois, this 16th day of January, 1912.

WILLIAM L. FRANKS.

Witnesses:
A. C. EDWARDS,
WILLIAM ROUNDS.